United States Patent [19]

Klute

[11] Patent Number: 4,552,507
[45] Date of Patent: Nov. 12, 1985

[54] POWER TRANSMISSION PLANT HAVING PRESSURE SURFACES

[76] Inventor: Ferdinand Klute, Fixberg 6, 4790 Paderborn, Fed. Rep. of Germany

[21] Appl. No.: 588,226

[22] Filed: Mar. 12, 1984

[30] Foreign Application Priority Data

Mar. 12, 1983 [DE] Fed. Rep. of Germany ....... 3308815

[51] Int. Cl.$^4$ ............................................. F04D 23/00
[52] U.S. Cl. ............................................. 415/5; 290/54
[58] Field of Search .................... 60/502, 716, 398; 290/43, 54; 415/5, 6

[56] References Cited

U.S. PATENT DOCUMENTS

| 676,467 | 6/1901 | Morgan | 415/5 |
| 855,164 | 5/1907 | Couture | 415/5 |
| 1,847,855 | 3/1932 | Young | 415/5 |

FOREIGN PATENT DOCUMENTS

| 839330 | 3/1939 | France | 415/5 |

Primary Examiner—Stephen F. Husar
Attorney, Agent, or Firm—Cushman, Darby & Cushman

[57] ABSTRACT

In a power transmission plant having pressure surfaces for utilizing the natural flow gradient of water and wind quantities, a plurality of identical parallel conduits are provided which are open at the upper end and each have a rectangular cross-section, wherein two rectangular pressure plates—acting as drive members—are disposed in each conduit so as to be displaceable in a straight line in the direction of flow, said pressure plates being connected to a main shaft and extending in cross-sectional planes of the conduit. Such a plant permits the kinetic energy of turbulent flows to be used for harnessing power, whereby in each conduit a pressure plate, which is displaced in the lower portion of the cross-section by the fluid flow, drives the main shaft, while the other pressure plate moves back into its starting position in the upper portion of the cross-section of the conduit in order to then pass into the lower portion and into the flow.

10 Claims, 13 Drawing Figures

POWER TRANSMISSION PLANT HAVING PRESSURE SURFACES

The present invention relates to a power transmission plant having pressure surfaces for utilising the natural flow gradient of water and wind quantities.

Such a plant serves to utilise the flow gradient which exists in nature with high tides, existing reservoirs and winds.

BACKGROUND OF THE INVENTION

Various forms of water and wind power plants are known, for example, turbines or water—or wind-mills. It became apparent in practice that the yield of energy obtained and measured was low in relation to the enormous water and wind quantities which were used. The reason for this is that the direction of flow of the driven quantities causes such quantities to encounter the segments of the rotor at an angle of 30° to 40°. This rotational pressure is then transmitted in a work-hindering manner at right angles to the direction of the flow quantity. Thus, in the described case, only a small portion of the energy is released.

The present invention seeks to provide a power plant wherein the pressure surfaces of the plant and the flow quantities extend in the same direction so that a single change of direction—which causes a loss of energy—for obtaining energy according to the hitherto conventional method is avoided.

SUMMARY OF THE INVENTION

According to the invention, this object is achieved with a power transmission plant having pressure surfaces by means of a plurality of identical, parallel conduits each having a rectangular cross-section, wherein two rectangular pressure plates—acting as drive members—are disposed in each conduit so as to be displaceable in a straight line in the direction of flow, said pressure plates being connected to a main shaft and extending in cross-sectional planes of the conduits.

The open conduits, which lie parallel alongside one another and through which the flow quantities are conducted, simultaneously accommodate all of the moving and non-moving component parts of the power plant. In the conduits which are open at their upper end, the pressure plates provide strongly constructed surfaces which are flat in themselves and rectangular and are forced into the same direction by the flow quantities.

Each pressure plate is preferably connected to upper endless open-link chains—which are conducted along the two lateral walls of the conduit in the flow direction—via two laterally protruding upper horizontal pins, and each pressure plate is preferably connected to lower endless open-link chains—which are conducted along the two lateral walls of the conduit beneath the upper open-link chain in the flow direction—via two laterally protruding lower horizontal pins, each open-link chain being tensioned on two guide wheels mounted on the lateral walls.

The open-link chains travel in recesses which are covered in the direction towards the inner surface of the conduit. They transmit the obtained energy to a centrally mounted main shaft via toothed wheels. The main shaft receives the obtained energy, controls the rate of flow, co-ordinates all of the moving component parts of the plant and transmits the obtained power to an assembly, for example, a generator for generating electric current.

Such power plants can preferably be mounted in series or staggered behind one another in or near rivers. The pressure gradient of the tides can also be used by such plants. By slightly changing the mechanics, the pressure gradient of winds can also be converted into energy. In each case, the full power of the pressure gradient of the flow quantities is converted into energy, less some slight energy losses which are caused by friction of the open-link chains or toothed wheels.

Each pressure plate is disposed in the front or rear longitudinal half, respectively, of the individual conduit in such a manner that, at the beginning of the path to be traversed, the pressure plate plunges into the flow so that it absorbs the flow pressure thereof in retreating manner and thereby supplies kinetic energy. At the end of the path traversed, the pressure plate is subsequently lifted out of the flow and travels back to the starting position above the flow. The pressure plates are immersed in and lifted out of the flow after pre-determined, operationally controlled intervals so that continuous rotation of the main shaft is ensured, such rotation being self-supporting and balanced. This ensured rotation is a pre-requisite for a constant transmission of energy from the main shaft to an assembly via a change-over gear. Shifting of the gear permits the speeds of the flow quantities to be reduced in association with the pressure plates in order to increase the water level so that damming occurs. Large flow quantities are determined by the weather conditions and will be accelerated by means of the change-over gear after the desired height for the water level has been obtained. To permit the described mode of operation, a plurality of parallel conduits which are open at their upper end are required. Each conduit has two longitudinal halves and accommodates the main shaft in its central region. The main shaft extends at right angles to the longitudinal axes of the conduits and centrally through all of the conduits which lie alongside one another.

On each side of each longitudinal half of one conduit, two pairs of toothed wheels are disposed in the lower portion of the conduit half and two pairs of toothed wheels are disposed in the upper portion of the conduit half above the above-mentioned toothed wheels. The axles of said toothed wheels are on a level with the base of the conduit, and the rotational path is determined by the spacing between said toothed wheels. These pairs are connected to rotating open-link chains and so covered with the toothed wheels in the conduit walls that the recess which accommodates the open-link chain is only open towards the conduit interior. The chain is also covered by its own screen at the flow end. The pressure plate height and the toothed wheel diameter should be twice the dimensions of the normal depth of the flow substances to permit damming. The difference in height between the water level in front of the pressure plate and the water level behind the pressure plate corresponds to the flow pressure.

A pressure plate is mounted in each conduit half between the two lower and upper horizontally-running pairs of open-link chains, the four corners of said pressure plate being individually connected to one respective chain of the four rotating open-link chains, that is to say being connected to the link members which, when the plant is in its position of rest, are in exactly the same positions in terms of height and length. This setting means permits the pressure plate to lie horizontally and vertically exactly at right angles in the conduit base or in the two conduit walls, respectively, even during operation. This method of mounting the pressure plate permits the pressure plate to be lowered into the flow during operation at the beginning of the path through each conduit half. The pressure plate is urged into the flow direction by the flowing fluid and absorbs the flow pressure in a retreating manner. Energy is thereby released. This energy is transmitted to the main shaft via open-link chains and transmitted further to the assembly via the change-over gear. The change-over gear serves to accumulate the flow quantities (low gear) in order to achieve a greater flow pressure via a greater flow gradient, or, however, in the event of large flow quantities occurring, to permit such quantities to be discharged in an accelerated manner (high gear). At the end of the path, the pressure plate is lifted out of the flow quantities in an operationally controlled manner and guided back to the initial or insert point above the flow quantities. This procedure occurs in all of the conduits.

During operation, the pressure plates in all of the conduits keep the entire flow quantities under control at all times. It is only when the pressure plates in the actual conduit are changed-over that small quantities of the flow are discharged. If, however, it is desirable to achieve a pre-determined unhindered free flow, it is necessary to leave a gap beneath all of the pressure plates in all of the conduits. A laterally mounted branch conduit, which is provided with a slide member would also permit a pre-determined, desired quantity of the flowing fluid to be discharged in a controlled manner.

The procedure in one conduit half was hitherto described, in addition to the associated component parts, but this relates to only one portion of a whole plant. It is known that one conduit has two conduit halves. A pressure plate is disposed in either the front or the rear portion of the conduit. The movements of these pressure plates are always alternate with one another at timed intervals, that is to say when pressure plate A is immersed and is pushed by the flow quantities, pressure plate B is lifted out of the flow and moves back into the starting position above the flow. When pressure plate B is immersed, pressure plate A is lifted out and moves back into the starting position. This procedure occurs continuously in all of the conduits. The movements of the individual pairs of pressure plates relative to one another in all of the conduits are also timed at pre-determined intervals, so that one half of all of the pressure plates is always immersed in the operational position in all of the conduits and pushed by the flow quantities, whilst the other half of the pressure plates is lifted out of the flow quantities and returns to the starting position, i.e. the immersion base. This largely prevents, in a continuous manner, any free and unhindered flow of the flow quantities.

The main shaft is connected in each conduit to eight rotating open-link chains—extending towards the main shaft—via two toothed wheels. Said chains transmit the energy obtained by the pressure plates to the main shaft which is connected, for example in three conduits, to 24 rotating open-link chains on either side of each half. The main shaft is an integrating component part of the total plant:
1. It transmits the energy, obtained by all of the pressure plates via rotating open-link chains, to the assembly via the change-over gear.
2. It co-ordinates all of the moving component parts of the plant and compensates for all of the different pressures and thrusts.
3. Because it is mounted centrally, it ensures that all of the pressure plates to which it is connected are simultaneously guided at an identical rhythm.
4. It continuously and uniformly transposes the energy values of the appropriately set shift step of the gear to all of the moving component parts of the plant.

The length of the two pressure plate paths in each conduit is limited only by the material strength of the adjusted open-link chains. In such case, a particularly positive effect is achieved by mounting the chain wheels on the base of the encircling recesses—initially left free for chains—since the inherent weight of the chains, thus mounted, of the total plant does not offer any resistance in the operational state. The open-link chain is so covered towards the recess side by its own screen that foreign bodies of solid or sludge type, which are carried along by the flow quantities cannot penetrate the recess. Conduit lengths of 80 m and 120 m and more can be built. The longer a conduit is, the smaller are the intervals for the raising and lowering of all of the pressure plates. The flow quantity of each flow in respect of its entire length can be utilised at pre-determined spacings, even when each flow has only low flow speeds.

It has hitherto been described how energy is obtained by the flow pressure in front of the pressure plates. It is also possible, by reducing the static pressure behind the pressure plate, that is to say towards the discharge side, to increase considerably the pressure gradient and hence also the flow pressure.

An important pre-requisite therefor is the constant pre-determined overflow quantities of the flowing fluid, which quantities flow over the upper edges of the installed pressure plates during operation. The air spaces caused by the flow of the overflow quantities then form behind the pressure plates. Said air spaces have a static pressure and move continuously with the flow quantities from which they are also screened. An apparatus will be described which reduces this static pressure and thereby increases the pressure gradient or flow pressure, respectively.

A discharge opening of pre-determined size has been left on either side of the pressure plates, said opening extending over the entire height of the pressure plates and opposite the conduit sides. A portion of the flow quantities flows through said opening and, in association with the baffle plates, causes the static pressure to be reduced behind each immersed pressure plate. The baffle plates are mounted on either side of the rear outer edges of the pressure plates and extend over the entire height of said pressure plates.

At the flow discharge end, the boundary edges of the baffle plates extend in identical manner to the central line of the overflow quantity towards the conduit base. They are virtually superimposed on one another. When viewed from the pressure plate, each baffle plate acts as a suction device and is provided with a narrow longitudinal slot in the whole lower half, said slot extending over a quarter of the width of the baffle plate and extending over half the height thereof. The longitudinal slot is provided with a projection member along its entire length in the direction of the flow end. The projection member directs a portion of the flow quantities flowing through the discharge opening towards the actual conduit side. Then the main quantity of the discharge substances conducts this portion—laterally pressed by the projection member—in the flow direction over the slot and thus causes suction. The suction causes a reduction in the static pressure of the air spaces screened by the overflow quantities and, as a consequence thereof, causes a potential increase in the pressure gradient.

The result could be improved, if necessary, by so-called monoflow jet pipes which should be mounted on the pressure plates in the lower third of the air spaces. They will not be mentioned in more detail since the mode of operation thereof is known.

Directly after each pressure plate had been immersed, as instantaneously rapid, powerful suction would also be possible if a static vacuum were achieved by means of a vacuum pump and non-return valves. It would be necessary for the suction manifold to lie in the conduit walls and extend towards the conduit interior at the locations situated directly behind the immersion points of the pressure plates. Contact switches would have to be responsible for connecting and/or disconnecting the suction manifold. Details of this will also not be given.

Mention has hitherto been made of fluid flow quantities as the driving forces. Air flow quantities may also serve as such. The above-described plant may be used for this purpose and would only need to be provided with a rotary disc which has a centrally located rotatable axis, about which a rail guide means would rotate in a circle, the forces of the wind flow machine being transmitted to the rail guide means and being conducted through the plant. The rail guide means also absorbs all of the other forces of the free, sometimes turbulent, wind flows or currents.

The rotary disc also serves to guide the plant into the actual wind direction by means of wind indicators. To operate the plant by wind, the pressure plates have to be replaced by segments which are combined in a frame and produce a pressure plate. The segments, in turn, must be axially mounted and must be capable of being opened or closed by means of a universal linkage, which joins all of the segments, due to mechanical pressure. When being lowered into the wind conduit, the segments close and form a closed pressure surface. When they are raised, the axially mounted segments rotate through 90° and thus only offer very little resistance to the wind quantities on the return journey to the starting point.

BRIEF DESCRIPTION OF THE DRAWINGS

In the accompaniny drawings

FIG. 1 is a perspective view of three parallel conduits which are each open at their upper end and have a common main shaft driven by the installed pressure plates via open-link chains;

FIG. 2 is a vertical, longitudinal sectional view through one conduit;

FIG. 3 is a perspective view of a pressure plate;

FIG. 4 is a sectional view, taken along the line IV—IV of FIG. 2, through a lateral region of a conduit;

FIG. 5 is a vertical, longitudinal sectional view through the pressure plate guided by two open-link chains; and FIG. 6 illustrates a conduit arrangement modified for the use of wind quantities;

FIG. 7 is a perspective view of a unit comprising four parallel conduits;

FIG. 8 is a vertical sectional view, taken along the line VIII—VIII of FIG. 7, through a conduit;

FIG. 9 is a perspective view of a pressure plate provided with two lateral plates;

FIG. 10 is a vertical sectional view through a suction device of a pressure plate;

FIG. 11 illustrates a leaf spring, disposed on the end of a conduit, for the pressure plate;

FIG. 12 is a vertical cross-sectional view through two adjacent conduits; and

FIG. 13 is a plan view of the region of the main shaft of two adjacent conduits.

DESCRIPTION OF PREFERRED EMBODIMENTS

Figure 1:
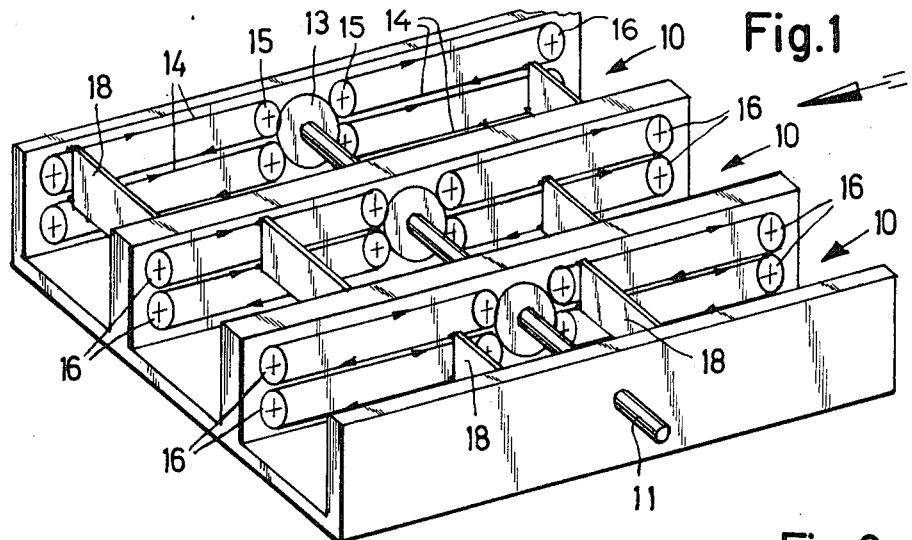
FIGS. 1 to 6 illustrate one embodiment.
Figure 2:
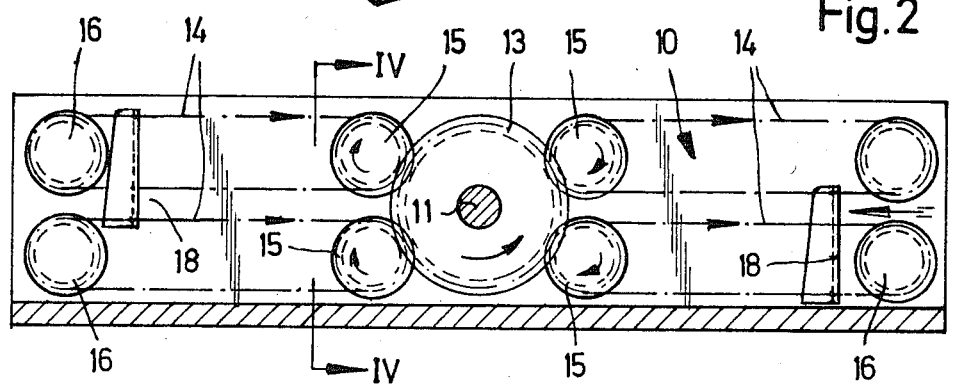
Figure 3:
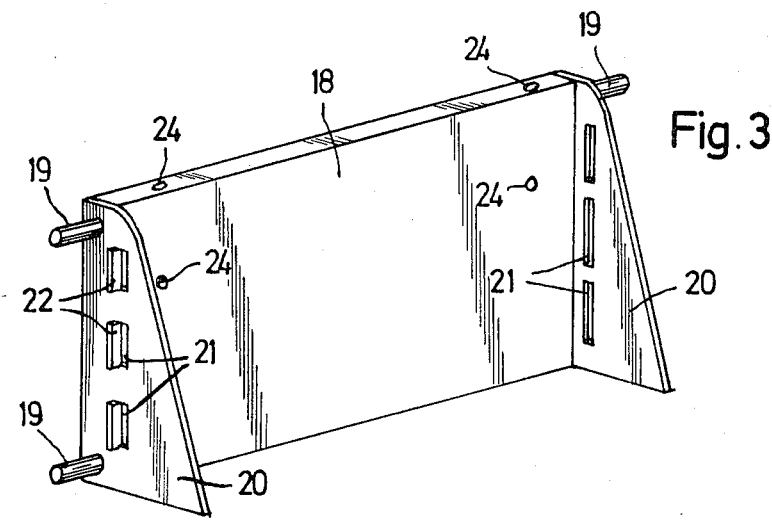
Figure 4:
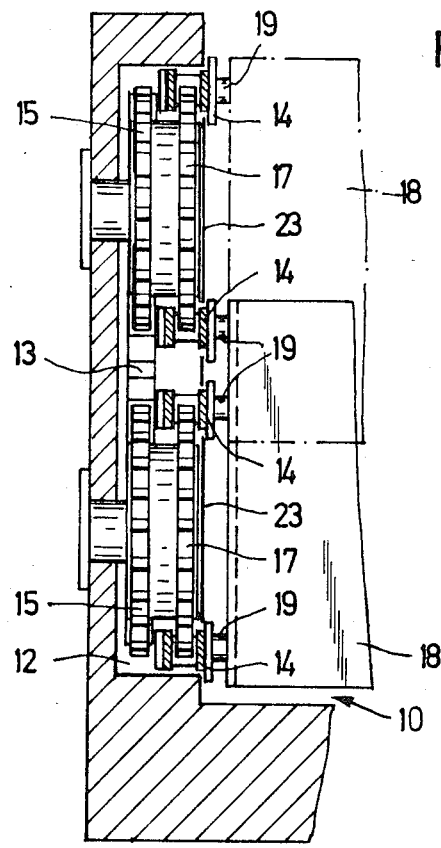
Figure 5:
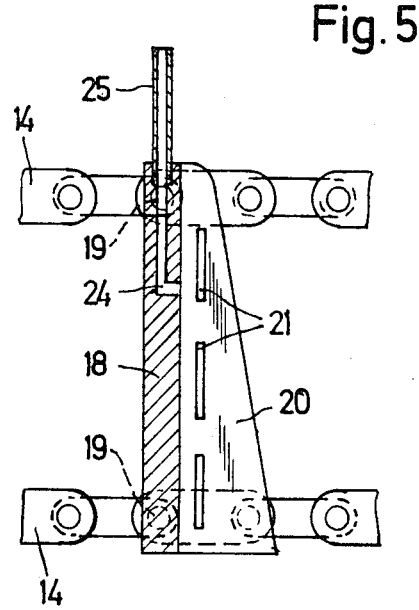

The power plant according to the embodiment illustrated in FIGS. 1 to 6 comprises three parallel conduits 10 which are each open at their upper end and have identical, rectangular cross-sections. A common main shaft 11 is mounted transversely to the flow direction in the central region of all of the conduits. The inner surface of each lateral wall of a conduit 10 is provided with a recess 12 which accommodates a driven toothed wheel 13 which is securely connected to the main shaft 11. Two endless open-link chains 14 are disposed one above the other in the recess 12 on each conduit half, each open-link chain 14 being tensioned on a driving toothed wheel 15—which is in engagement with the driven toothed wheel 13 of the main shaft 11—and on a guide wheel 16 mounted at the end of the conduit. For this purpose, a coaxial chain toothed rim 17 is provided on the driving toothed wheel 15 to accommodate the open-link chain 14.

Each conduit 10 includes two rectangular pressure plates 18 which are mounted on the open-link chains 14 by means of laterally protruding, horizontal pins 19, that is to say the upper pins 19 are mounted on the upper open-link chain 14, whilst the lower pins 19 are mounted on the lower open-link chain 14 mounted beneath the upper open-link chain 14. This arrangement permits the pressure plates 18 to be displaced, thereby causing the two open-link chains 14 to rotate and such an arrangement permits the toothed wheel 13 of the main shaft 11 to be driven by the driving toothed wheels 15 of the open-link chains. The main shaft 11 which is thus driven may then drive, for example, a generator for generating electric current.

The two pressure plates 18 of each conduit 10 are so disposed that there is always at any given time a pressure plate 18 located in the lower region of the conduit 10 and a pressure plate located in the upper region of the conduit 10. The lower pressure plate 18 passes into the flowing fluid and is displaced thereby until it has reached its end position in the region of the main shaft. There, it is lifted out of the flowing fluid and is moved into the upper plane. During this procedure, the other pressure plate 18 has moved from the upper plane into the lower plane and is now conveyed further by the flowing fluid.

Figure 6:
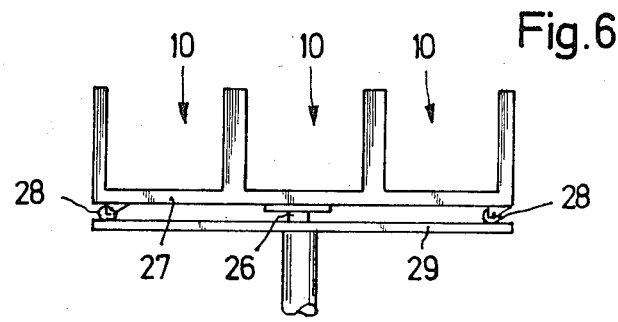
Figure 7:
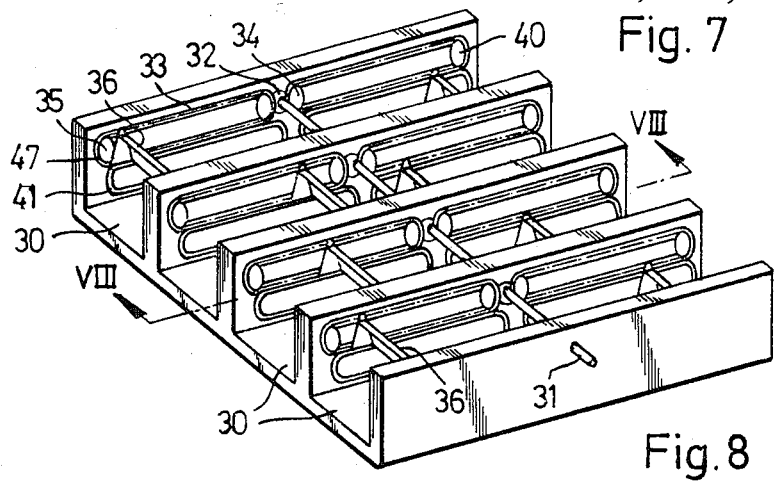
FIGS. 7 to 13 illustrate a second embodiment of a plant which operates with fluid flow quantities.
Figure 8:
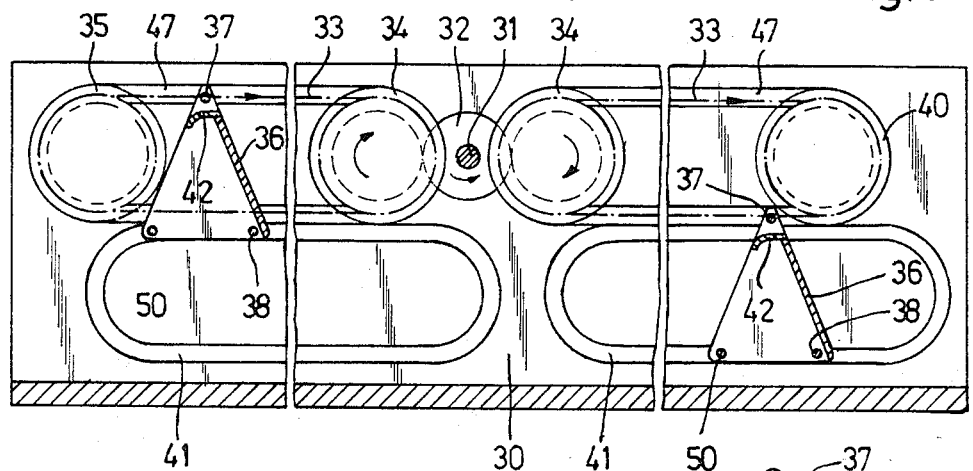
Figure 9:
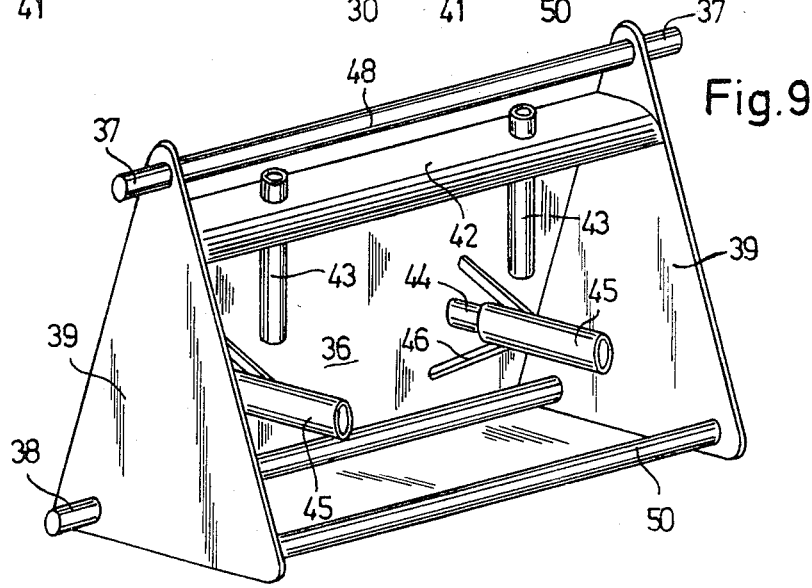
Figure 10:
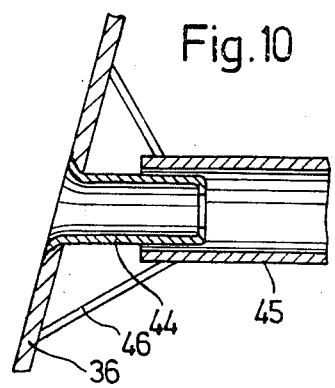

Two vertical baffle plates 20 are disposed on either side of each pressure plate 18, said plates 20 extending in the flow direction and being provided with longitudinal slots 21 which extend vertically in a straight line. These longitudinal slots may be produced by deflecting projection members 22 which are disposed on the outer surfaces of the baffle plates 20 in relation to the pressure plate 18, that is to say in the space between the baffle plates 20 and the lateral walls of each conduit 10. In such case, the recesses 12 are covered by screens 23 on the lateral walls. The pressure plates 18 may be provided with vertical ventilation conduits 24, and ventilation tubes 25, which protrude from the upper edge, are mountable on the upper ends of said ventilation conduits 24. Air can flow through these tubes 25 and conduits 24 into the space in front of the pressure plate 18, said space being laterally defined by the baffle plates 20 and being sealed by the stream of fluid flowing over the upper edge of the pressure plate 18, and the quantity of air is controlled by a differential pressure overflow valve. The arrangement of the conduits 10 as shown in FIG. 6 of the drawings for the utilisation of wind power is effected by means of a rotatable axle 26 which is vertically mounted, and the bases of the conduits 10 are in the form of a common rotary disc 27 mounted on the upper end of said axle 26. The rotary disc 27 is supported on a fixed horizontal supporting plate 29 by means of rollers 28.

Various forms of power transmission plants having pressure surfaces are known, for example, turbines or water mills. In such case, it became apparent in practice that a pressure gradient of 10 m or more is necessary for the economic use of turbines because of the installation of long and large feeder pipe manifolds. It is particularly expensive to lay such feeder pipe manifolds in mountainous regions.

The invention also seeks to provide a power plant which permits the elimination of large feeder pipe manifolds and large differences in height, whereby the pressure surfaces of the plant and flow quantities of water—as the flow medium—move in the same rectilinear direction.

This object may also be achieved by a plant wherein pressure plates are only connected at their upper ends to open-link chains, whilst their lower ends are guided only in guide grooves formed in the conduit walls without any open-link chains.

In such a plant, the flowing quantities of water are dammed so that, as a result of the damming pressure, the pressure plate is displaced and, in turn, drives a main shaft by means of open-link chains and driving toothed wheels. The power plant is especially suitable for use in rivers and tidal areas along coasts.

A conduit is described hereinafter having two pressure surfaces which are each disposed in a respective conduit half. The pressure surface of each conduit half extends in transverse flow direction over the entire width of the conduit. This rectangular pressure surface is disposed in the conduit so as to be displaceable in a straight line in the direction of flow, thereby eliminating the need to change the direction of the flow substances, such a need being conventionally required and causing a loss of energy. The pressure surface in such case, comprises a rectangularly shaped steel profile frame, the lateral plates of said frame forming two acute-angled triangles. The pressure surface is provided laterally, and towards the pressure side, with profiled steel plates. Because of the nature of the upright triangle, the actual pressure surface therefore leans at an incline relative to the pressure-remote side. The angle of inclination may be approximately 23° to 24°. At its two ends, the pressure surface is connected to two lateral open-link chains above the water surface via the triangular lateral plates and the internal struts thereof which extend from triangle to triangle. Upper pins are used for this purpose, such pins being component parts of the open-link chains and protruding at right angles from the outer surfaces of the lateral plates. Lower pins which protrude outwardly towards the pressure side are disposed on the lower ends of the lateral plates and are mounted on rollers, said lower pins being guided by said rollers in guide grooves disposed in the lateral walls of the conduit. The guide grooves are so formed that they correspond to the course of the open-link chains so that, in the operational state, the movements of the upper and lower pins are co-ordinated. The pressure surface is therefore guided at its lower end in the guide grooves and retained at its upper end by the open-link chains.

The conduit through which the flow quantities of the flowing medium, i.e. the water, are conducted accommodates all of the moving and non-moving component parts of the power plant. Preferably, a plurality of identical, parallel conduits each having a rectangular cross-section are combined to form one plant. Each conduit has two longitudinal halves and accommodates the main shaft in its central region above the water surface. The main shaft extends at right angles to the longitudinal direction of the conduits, that is to say at right angles to the flow direction, and is located on the same plane in the conduits with all of the rotating wheels. Four guide wheels are disposed in each conduit at either end of the internal surfaces above the water surface, each set of two guide wheels being serrated with the driving toothed wheel of the main shaft in the middle of the conduit. Endless open-link chains are tensioned by the individual pairs of rotating wheels. The open-link chains, which guide each pressure plate over the two laterally protruding, upper horizontal pins, are disposed on or in the two lateral walls of the conduit and travel with their direction of motion either in the flow direction or in opposition to the flow direction. In the case where the chains are disposed within the lateral walls, recess-like encircling guide means may be provided with a U-shaped profile, and such guide means are open towards the inner surface of the conduit. The upper and lower limits for the niche-like recesses correspond to the height of the open-link chain plus the necessary tolerance.

In addition to the upper encircling guide means, the lower guide grooves are disposed in each conduit half at both lateral walls. A lower guide groove corresponds to each upper encircling guide means. The lower guide grooves on either side of the right-hand conduit half commence beneath the rotating wheels which are serrated by the main shaft; said grooves extend downwardly in a semi-circle into the vicinity of the conduit base, follow the conduit base in a parallel manner and terminate with a semi-circle on the right laterally beneath the guide wheel at the beginning of the front conduit half. In the left-hand conduit half, the lower guide grooves extend congruently in terms of height and length. The upper portions of the lower guide grooves are each disposed above the water surface and accommodate the rollers of the pressure surface pins at either end.

The upper encircling guide means at either end in the right-hand conduit half commence with a circular raised portion beneath the guide wheels which are serrated by the main shaft; said guide means extend above the guide wheels horizontally in opposition to the flow direction to the guide wheels in the front conduit half, follow the guide wheels in a semi-circle downwardly and travel further horizontally to the starting point. In the left-hand conduit half, the encircling guide means also extend congruently in terms of height and length and accommodate the endless open-link chains to which the upper ends of the pressure surfaces at both sides are secured.

The visible front ends of all of the guide wheels are level with the inner surfaces of the conduits. All of the guide wheels in the immediate vicinity of the main shaft have toothed wheels in the direction of the wall end. Said toothed wheels are serrated in pairs at the same height and opposite one another by means of the respective drive wheel of the main shaft. The main shaft extends in the cross-sectional plane through the centre of all of the conduits and absorbs the entire energy transmitted from the flow substances to the pressure surfaces. The main shaft and the axles of all of the guide and drive wheels are situated at the same height.

The procedure of immersing, displacing and lifting the pressure plates occurs alternately in all of the conduits during operation, but after pre-determined intervals, so that certain zero energy positions which occur very briefly during the lifting or immersing of two pressure plates are bridged by the other pressure plates which, in their immersed state, are situated in the adjacent conduits.

The immersing or lifting of the pressure plates after pre-determined intervals conditioned by the operation occurs so that a continuous rotation of the main shaft is ensured, such rotation being self-supporting and balanced. This is the pre-requisite for a constant transmission of energy from the main shaft to an assembly via a change-over gear. The shifting of the gear permits the speeds of the flow quantities to be reduced in association with the pressure plates in order to increase the water level so that an accumulation is produced. With the occurrence of large flow quantities due to weather conditions, such large flow quantities will be so regulated by appropriate stepped shifts that the desired height of the water level is maintained. It is also possible to build the entire power transmission plant having pressure surfaces as a so-called pontoon so that it is adapted in floatable manner to the actual water level at any given time. Such a plant would then have to be secured to long hawsers which extend in the direction of flow in a diagonally inclined manner and be prevented from tilting. Plants of such type could be built without any restriction regarding location and could be floated into the installation site.

The pressure plate height and the diameters of the guide wheels should be twice the dimensions of the normal depth of the water flow substances to permit damming. The difference in height between the water level in front of the pressure plate and the water level behind the pressure plate corresponds to the flow pressure. During operation, the pressure plates in all of the conduits keep the entire flow quantities under control at all times. If, however, it is desirable to achieve a predetermined unhindered free flow, it is necessary to leave a gap beneath all of the pressure plates in all of the conduits. A laterally mounted branch conduit, which is provided with a slide member would also permit a predetermined, desired quantity of the flowing fluid to be discharged in a controlled manner.

Suction devices, comprising two pipe connections, may be disposed in the lower quarter of the pressure plate. Portions of the flow quantities are pressed through said suction devices—which have nozzle-like constrictions—so that a static vacuum occurs in the space behind the pressure plate because the water flow substances, which flow over and along both sides of the pressure plate, screen the space behind the pressure plate from the normal static air pressure. Because of this screened air cushion having static vacuum as compared with the normal static pressure in the outer surroundings of the air cushion, the atmospheric resistance pressure behind the pressure plate is reduced and the thrust forces of the flow substances are proportionally increased. The function of the suction device is universally known. However, in order to obtain a controlled vacuum, adjustable compensating valves would have to be disposed on the pressure plates. The upper portions of the lateral plates of the pressure plates are connected to the rotating, endless open-link chains. Advantageously in such case, any greater chain cylinders which may be incorporated therein would assume the actual weight of the chains and pressure plate because of the reduced friction. This becomes particularly effective with long paths to be traversed, which paths are produced between the immersing or lifting points of the individual pressure plates during the operational state. The upper niche-like encircling guide means for guiding the open-link chains and the lower guide grooves for guiding the pins and/or rollers are congruent in all of the conduits, but only the latter are forwardly displaced due to operating conditions. In the direction of the inner surface of the conduit, the open-link chains may be provided with screens which prevent the entry of foreign bodies from the atmosphere. Since the region of the open-link chains is completely above the water surface, small foreign bodies are nevertheless transmitted from the flow quantities to the open-link chains.

Whilst the pressure plates press the open-link chains downstream in the operational state over the upper surfaces of the lateral plates and thus supply energy via the guide wheels of the main shaft, the lateral lower pins—with their rollers mounted in the guide grooves—take over the encircling guide means in the lower region of the pressure plates.

Mention should be made again of the fact that the lengths of the two lateral plates of the pressure plates are longer than the vertical central line of the triangular lateral plates. Thus, the pressure surfaces are upwardly inclined towards the side remote from pressure by an inclination of approximately 23° to 24°. Thus, on their horizontal paths, on the one hand they are connected at their upper end to the chain links and, on the other hand, they are mounted at their lower end on rollers which, because of the pressure of the flow quantities, never reach the vertical point beneath the open-link chain connections. This is the pre-requisite for permitting the pressure plates, in co-operation with the niche-like guide means and the open-link chains, to absorb the water pressure in retreating manner in the operational state, whereby the flow pressure is transmitted via the bottom of the pressure plates to the rollers and via the top of the pressure plates to the open-link chains. This permits the position of the pressure plate—inclined in the flow direction—to be maintained in an operationally reliable manner. Since foreign bodies in the flow quantities can be carried along, although a relatively coarse filtering operation should be carried out, it is advisable to mount in front of the rollers so-called hard rubber shells or the like which push relatively small sediments to the interior of the conduit.

The power plant according to the embodiment illustrated in FIGS. 7 to 13 comprises four parallel conduits 30 which are open at their upper end and have identical, rectangular cross-sections. A common main shaft 31 is mounted transversely to the flow direction in the central region of all of the conduits. The inner surface of each lateral wall of a conduit 30 is provided with a recess which accommodates a driven toothed wheel 32 which is securely connected to the main shaft. An endless open-link chain 33 is disposed in the recess formed in a conduit side on each conduit half, said open-link chain 33 being tensioned on a driving toothed wheel 34—which is in engagement with the driven toothed wheel 32 of the main shaft 31—and on a guide wheel 35 mounted on the end of the conduit 30.

Each conduit 30 comprises two rectangular pressure plates 36 which are guided by laterally protruding, horizontal upper pin 37 and lower pins 38. The upper pins 37 protrude horizontally and at right angles from the outer surface of lateral plates 39 which laterally define the pressure plate 36. They are component parts of the endless open-link chain 33 and are tensioned at the lateral walls on the driving toothed wheels 34— which act as guide wheels—and on additional guide wheels 35 or 40, respectively. In such case, the open-link chains 33 move in a horizontal direction parallel to the flow, whereby the lower portion of each open-link chain moves in the flow direction and the upper portion of each open-link chain moves in opposition to the flow direction. The open-link chains 33 in the first conduit half are disposed on the same level as the open-link chains 33 in the second conduit half, and consequently the horizontal axles of all of the driving toothed wheels 34, of the guide wheels 40, of the driven toothed wheels 32 and of the main shaft 31 are equidistant from the base of the respective conduit 30.

Guide grooves 41 are disposed in the lateral walls in the lower regions of each conduit, each guide groove 41 corresponding to the guide groove 47—disposed thereabove—of the open-link chain 33. Lower pins 38, which protrude at right angles from the lateral plates 39, are mounted in the guide grooves 41 via rollers so that the pressure plates 36 are guided at their lower ends during their horizontal movement in the flow direction. The lower pins 38 are not disposed vertically below the upper pins 37, but are disposed in a corner of the lateral plate 39, so that the imaginary line connecting the lower pin 38 to the upper pin 37 is disposed in inclined manner relative to the vertical. In corresponding manner, the pressure plate 36 is also inclined.

A horizontal wall 42 is connected to the upper edge of the pressure plate 36 and, in the embodiment, two vertical pipe connections 43 extend through said wall 42 in order to ventilate or aerate the space behind the pressure plate 36. The pressure plate 36 itself has two suction devices, each of which comprises two horizontal pipe connections 44 and 45. The pipe connection 44 extends along the rear end of the pressure plate 36 and terminates in a through-bore formed in the pressure plate, so that the front end of the pressure plate is connected by the pipe connection 44 to the rear end of the pressure plate. In each case, the horizontal pipe connection 45 having a relatively large diameter is slipped over a short length of the pipe connection 44 and retained on the pressure plate 36 by struts 46, so that there is an annular space produced between the outer surface of the pipe connection 44 and the inner surface of the pipe connection 45; when flow medium flows through the pipe connection 44, the medium disposed at the rear end of the pressure plate 36 is drawn-in through said annular space.

The ends of the pipe connections 44 disposed within the pipe connections 45 are provided with inwardly extending annular flanges, so that a constriction occurs. As the flow quantities flow through the connections, these constrictions cause eddies or vortices which are transmitted by the main flow-through quantities to the inner walls of the pipe connections 45 and thus produce a static vacuum (tensile force) behind the pressure plate.

Figure 12:
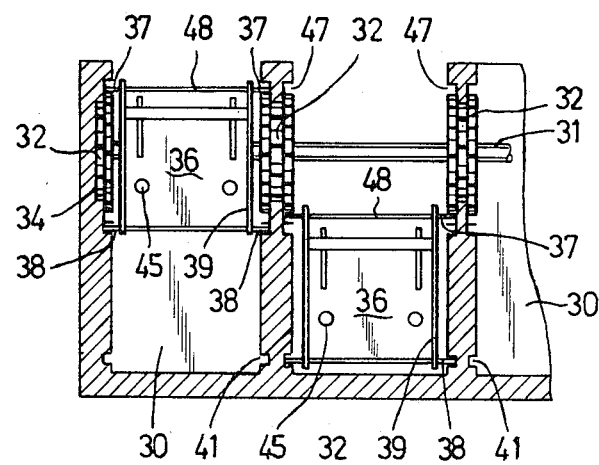
Figure 13:
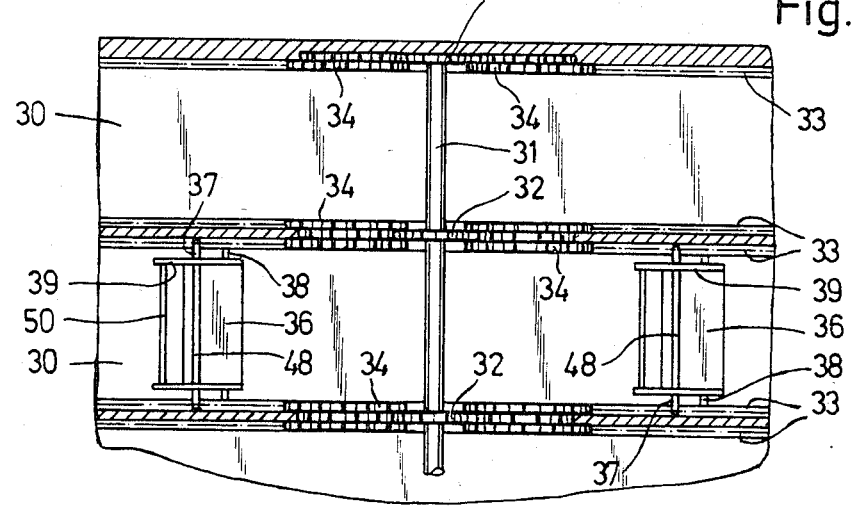

The upper guide grooves 47 of the conduit walls are visible in FIG. 12 of the drawings, and the open-link chains 33 are disposed in said grooves 47. The pins 37 and 38 are the respective ends of continuous, horizontal transverse struts 48 which extend between the lateral surfaces 39 of the pressure plate 36.

Figure 11:
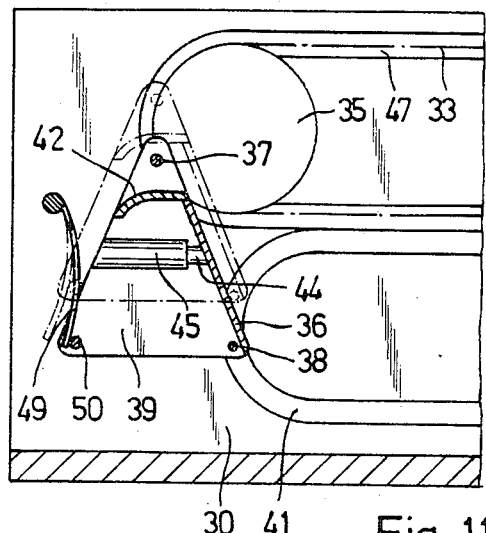

According to FIG. 11 of the drawings, a leaf spring 49 may be disposed in the conduit at the end of the path of motion of the pressure plate 36. The pressure plate 36, which has been displaced as a consequence of the flow and has reached the end, then compresses the leaf spring 49 with its transverse strut 50 so that energy is stored, and such energy is then transmitted again from leaf spring 49 to the pressure plate 36 when the flow no longer acts upon the pressure plate 36, that is to say when the pressure plate 36 has been lifted out of the flow medium. Now the leaf spring 49 presses the pressure plate 36, therefore, into its rearward movement, so that the leaf spring 49 contributes towards overcoming the dead centre of the path of motion of the pressure plate 36. The leaf spring 49 contributes, therefore, towards equalising the courses of motion.

I claim:

1. A power transmission plant for utilising the natural flow gradient of water or wind comprising a plurality of identical parallel fluid conduits, each having upper and lower longitudinal portions; a first pressure plate fixed in a generally upright position and disposed transversely in and displaceable along the upper portion of each conduit and a second upright pressure plate fixed in a generally upright position and disposed transversely in and displaceable along the lower portion of each conduit; a rotatable power output shaft; and guide and transmission means engaging and cooperating with the upper and lower portions of both pressure plates of each conduit such that upon movement of one of the plates along the respective conduit under the influence of fluid flowing along the conduit, the other plate moves along the conduit in an opposite direction and such that at the end of a predetermined path of travel the first plate is guided vertically into the lower portion of the conduit and the second plate is guided vertically into the upper portion of the conduit, said guide and transmission means being connected to said power output shaft to rotate the same upon movement of the plates.

2. A power plant as recited in claim 1, wherein each pressure plate is connected to upper endless open-link chains which are guided along the two lateral walls of the fluid conduit in the flow direction via two laterally protruding horizontal pins on the upper portion of said pressure plate, and each pressure plate is connected to lower endless open-link chains which are conducted along the two lateral walls of the conduit beneath the upper open-link chains in the flow direction via two laterally protruding horizontal pins on the lower portion of said pressure plate, each open-link chain being tensioned on two guide wheels mounted on the lateral walls.

3. A power plant as recited in claim 1, wherein each pressure plate is mounted between two triangular lateral plates, whereby an upper pin and a lower pin are disposed on the outer surface of each lateral plate, said upper pin protruding at right angles and extending transversely to the flow direction, and said lower pin lying parallel to the upper pin; the upper pins of the lateral plates being connected to endless open-link chains which are guided in the two lateral walls of the fluid conduit in the flow direction, each open-link chain being tensioned on two guide wheels mounted in the lateral walls; and a guide groove, which corresponds to the chain path, is disposed in the lateral walls of each conduit beneath each open-link chain, the lower pin of the adjacent lateral plate being guided in said guide groove.

4. A power plant plant as recited in claim 2 wherein the power output shaft extends through each of the conduits in the centre of each conduit transversely to the flow direction, driven toothed wheels being mounted on the output shaft and being in engagement with driving toothed wheels which act as guide wheels for guiding the open-link chains; and the connection between each driving toothed wheel for the open-link chain and for the main shaft is formed by an additional toothed rim of the driving toothed wheel which is in engagement with an associated driven toothed wheel of the main shaft.

5. A power plant as recited in claim 4, wherein the axes of the driving toothed wheels and of the guide wheels for guiding the open-link chains on both sides of each conduit extend parallel to the conduit base.

6. A power plant as recited in claim 5, wherein the spacing, determining the path to be traversed by the pressure plate, between the guide wheel and the driving toothed wheel for an open-link chain is identical in all of the conduits.

7. A power plant as recited in claim 6, wherein the top and bottom of the lateral walls are provided with guide grooves which are self-contained, said grooves being identical in terms of height and length and being offset relative to one another at the flow end; and the axes of the driving toothed wheels and guide wheels for guiding the open-link chains on both sides of each conduit extend on a level with the axis of the main shaft.

8. A power plant as recited in claim 7, wherein one of the two pressure plates of a conduit is disposed in an upper plane of motion externally of the flowing medium, whilst the other pressure plate is disposed in a lower plane of motion internally of the flowing medium.

9. A power plant as recited in claim 8, wherein two lateral, vertical baffle plates are disposed on each pressure plate and extend in the flow direction, a plurality of vertical longitudinal slots being disposed in a straight line behind one another in said baffle plates, and said slots are chamfered in the direction of the flow end, whereby the boundary lines of the baffle plates adjacent to the overflow side of the pressure plate are adapted to the flow limit for the overflowing quantity.

10. A power plant as recited in claim 9, wherein the lower portion of each pressure plate is provided with at least one through-bore which is connected, on the rear surface remote from the flowing medium, to horizontal pipe connections of a suction device; and a horizontal wall, disposed between the lateral plates, is connected to the upper edge of the pressure plate, whereby the space, which is disposed beneath the wall and is defined by the rear surface of the pressure plate is connected to the outside by means of vertical pipe connections which act as compensating valves and extend through bores in the wall.

* * * * *